(12) United States Patent
Fujii et al.

(10) Patent No.: US 9,443,150 B2
(45) Date of Patent: Sep. 13, 2016

(54) DEVICE AND METHOD FOR DETECTING OBJECTS FROM A VIDEO SIGNAL

(71) Applicant: Hitachi Kokusai Electric Inc., Tokyo (JP)

(72) Inventors: Miyuki Fujii, Tokyo (JP); Wataru Ito, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 14/378,388

(22) PCT Filed: Nov. 30, 2012

(86) PCT No.: PCT/JP2012/081144
§ 371 (c)(1),
(2) Date: Aug. 13, 2014

(87) PCT Pub. No.: WO2013/132711
PCT Pub. Date: Sep. 12, 2013

(65) Prior Publication Data
US 2015/0043775 A1 Feb. 12, 2015

(30) Foreign Application Priority Data
Mar. 7, 2012 (JP) .................................. 2012-050396

(51) Int. Cl.
*G06K 9/00* (2006.01)
*G06T 5/00* (2006.01)
(Continued)

(52) U.S. Cl.
CPC ............. *G06K 9/00771* (2013.01); *G06K 9/00* (2013.01); *G06K 9/00362* (2013.01);
(Continued)

(58) Field of Classification Search
None
See application file for complete search history.

(56) References Cited

U.S. PATENT DOCUMENTS

2008/0002062 A1* 1/2008 Kim ........................ G06T 5/009
348/602
2009/0297039 A1* 12/2009 Reinpoldt et al. ............ 382/209
(Continued)

FOREIGN PATENT DOCUMENTS

| JP | 4-213195 A | 8/1992 |
| JP | 8-171689 A | 7/1996 |

(Continued)

OTHER PUBLICATIONS

International Search Report issued in corresponding application No. PCT/JP2012/081144 on Jan. 8, 2013.
(Continued)

*Primary Examiner* — Tahmina Ansari
(74) *Attorney, Agent, or Firm* — Brundidge & Stanger, P.C.

(57) ABSTRACT

A technique is proposed for enabling stable detection of an object even when the contrast of an image is lowered overall or partially.
A preprocessing section 12 is added to the upstream stage of an object detecting processing section 13, and provides an obtained corrected image (image obtained by subjecting an input image to contrast enhancement) as an input image for the object detecting processing section 13. This facilitates the detection of the object even when the contrast of the entire screen is lowered due to fog or rain. Furthermore, the object detecting processing section 13 detects the object by using not only the corrected image from the preprocessing section 12 but also correction characteristic information 23 containing image characteristics regarding the correction (contrast enhancement). This attempts to reduce an influence of noises enhanced by the contrast enhancement.

4 Claims, 5 Drawing Sheets

(51) Int. Cl.
*G08B 13/196* (2006.01)
*H04N 7/18* (2006.01)

(52) U.S. Cl.
CPC .............. *G06T 5/008* (2013.01); *G06T 5/009* (2013.01); *G08B 13/19604* (2013.01); *G06T 2207/10004* (2013.01); *G06T 2207/20208* (2013.01); *G06T 2207/30196* (2013.01); *G06T 2207/30232* (2013.01); *H04N 7/18* (2013.01)

(56) References Cited

U.S. PATENT DOCUMENTS

| | | | |
|---|---|---|---|
| 2010/0182433 A1* | 7/2010 | Shimbo et al. | 348/153 |
| 2012/0051637 A1* | 3/2012 | Morimoto | G06T 5/40 382/169 |
| 2012/0106849 A1* | 5/2012 | Tojo | G06T 7/0081 382/195 |
| 2013/0170760 A1* | 7/2013 | Wang | G06K 9/00771 382/224 |
| 2013/0176430 A1* | 7/2013 | Zhu | G06T 7/2053 348/143 |
| 2013/0236098 A1* | 9/2013 | Fujisaki | G06T 7/0081 382/171 |
| 2014/0320666 A1* | 10/2014 | Badawy | H04N 7/18 348/169 |

FOREIGN PATENT DOCUMENTS

| | | |
|---|---|---|
| JP | 2001-197483 A | 7/2001 |
| JP | 2005-115932 A | 4/2005 |

OTHER PUBLICATIONS

International Publication issued in corresponding application No. PCT/JP2012/081144 on Sep. 12, 2013.

* cited by examiner

DEVICE AND METHOD FOR DETECTING OBJECTS FROM A VIDEO SIGNAL

BACKGROUND

1. Technical Field

The present invention relates to a technique for detecting an object that has emerged within a monitor region, on the basis of an image obtained by photographing the monitor region.

2. Related Art

There have been conventional techniques for monitoring the presence of an intruding object (including an intruder) that has invaded a monitor region. Specifically, in these techniques, an intrusion detection device analyzes input images based on a video signal from a camera photographing the monitor region, and detects an object that has emerged within the monitor region.

Conventional intrusion detection devices will be described.

One exemplary intrusion detection device is implemented using a computer that includes: an image input I/F that converts an analog video signal obtained from a camera into a digital video signal (A/D conversion) and provides input images each of which is expressed by a luminance signal having a predetermined tone number; an image memory that is used to make a calculation between the images and store these; a CPU (Central Processing Unit) that performs an image analyzing process; an input and output I/F that receives command signals and the like from the outside and transmits alarm signals and the like to the outside; a working memory that serves as a working region for the CPU; a program memory that stores a program for the above image analyzing process; an image output I/F that converts the digital images stored in the image memory into an analog video signal (D/A conversion) and outputs it to the outside (e.g., monitor screen); and a data bus through which the above functional units transfer data.

First, the intrusion detection device creates a background image to be used for intrusion detection. This background image is created with a plurality of input images that have been obtained from the camera through the image input I/F at preset frame intervals. Specifically, the intrusion detection device creates an image in which no object (intruding object) targeted for detection is present, by calculating the weighted average of a plurality of temporally differing input images.

After the creation of the background image, the intrusion detection device repeatedly performs both an object detecting process and a video displaying process, which will be described below, every time capturing the video signal (input image) from the camera. In addition, when detecting an intruding object (including an intruder), the intrusion detection device performs an alarm process.

In the object detecting process, the intrusion detection device calculates the difference between the created background image and a newly captured input image, creating a difference image (input image−background image). Then, the intrusion detection device creates a binary image by binarizing the difference image with a predetermined binary threshold, and creates a noise-removed image by removing noises (cluster of multiple pixels) contained in the binary image. Following this, the intrusion detection device regards the clusters of pixels left on the noise-removed image as objects, labels each object (cluster), and calculates the width, height and area of each object. Next, the intrusion detection device determines whether each labeled object is a person (intruder) or not by identifying the type of each object on the basis of its size, staying time, moving distance, and the like. If the object is determined to be an intruder, the intrusion detection device performs an alarm process in which an external apparatus outputs an alarm, for example, by lighting Patlite (registered trademark) lamp, sounding a buzzer, or telling a server. In this process, the intrusion detection device updates the background image every time capturing an input image from the camera, in order to follow a temporal, continuous state change in the video.

In the video displaying process, the intrusion detection device outputs the input images captured from the camera to, for example, a monitor that an observer is watching, through the image output I/F, and then displays these input images on the monitor. In addition, if an intruder is present, the intrusion detection device superimposes letters "intruder detected," a marker indicating the detected location, and the like onto the input images, and then outputs these images (intruder-information-added images) to the monitor.

Various inventions regarding object detection have been proposed so far. For example, JP 2009-117956 A discloses the invention of an object detection method that considers a case of being applied to integrated security systems and traffic analyses under complex disturbance, for example, in which brightness constantly or temporarily changes, a leaf or water surface moves, or snow or rain causes attenuation.

SUMMARY

According to the methods described above, a video signal (input image) obtained from a camera is processed directly. Therefore, for example, when the contrast of an entire image is lowered due to fog or rain or when a person in dark clothing enters into a dark place and there is no significant difference in contrast between the clothing and the background, the contrast difference between the object and the background becomes equal to or less than a binary threshold, in which case there arises a risk of failing to detect the object. For this reason, a technique for enabling stable detection of an object even in such a situation is being desired.

Contrast enhancement can be used as a method of correcting the image when the contrast of an entire image is lowered. This contrast enhancement has the merit of providing an image from which an intruding object will be able to be detected easily, but it also has the drawback to enhance noises in the image and increase the probability of an occurrence of an erroneous alarm. It is thus necessary to devise a method of suppressing an occurrence of an erroneous alarm which would be caused by the enhanced noises.

In the case where the contrast of an input image is locally lowered, such as when a dark object is present in a dark place, it is also required that local contrast enhancement be performed, because the contrast enhancement for the entire input image cannot support this locally lowered contrast. When the entire or local contrast enhancement is performed, however, the luminance level between frames significantly changes at the moment when the contrast enhancement is switched from an off state (stop) to an on state (start) or from an on state (start) to an off state (stop). As a result, the level difference is generated in the object region as well as the background part such as a building. A problem with this is that it is impossible to recognize the border between the background part and the object part and to identify correctly the size of the object, risking a failure to detect the object. Furthermore, another problem is that the probability of an occurrence of an erroneous alarm is increased when a difference generated in the background part has substantially the same size as in the object. For these reasons, it is necessary to devise any method of preventing a difference from being generated in the background part, such as a building, to the extent possible.

The present invention addresses the above problems with an object of providing a technique for enabling stable detection of an object even when the contrast of an image is lowered overall or partially.

The present invention is an object detection device which detects an object that has emerged within a monitor region, on the basis of an input image from a camera photographing the monitor region. The object detection device includes: preprocessing means for correcting the input image by enhancing its contrast; and object detecting means for detecting the object that has emerged within the monitor region by using the input image corrected by the preprocessing means and correction characteristic information, the correction characteristic information containing an image characteristic regarding the correction. The present invention can also be implemented using another aspect, such as a method performed by the above object detection device or a program for this method.

According to the present invention, preprocessing is added to the upstream stage of an object detecting process, and a corrected image obtained through this preprocessing (an image obtained by subjecting an input image to contrast enhancement) is provided as an input image for the object detecting process. This facilitates the detection of an object even when the contrast of an entire screen is lowered due to fog or rain. Furthermore, in the object detecting process, the object is detected with not only the corrected image obtained through the preprocessing but also correction characteristic information containing image characteristics regarding the correction (contrast enhancement). In this way, the present invention attempts to reduce an influence of noises enhanced by the contrast enhancement.

The above configuration enables stable detection of an object even when the contrast of an image is lowered overall or partially.

According to the present invention, in the preprocessing, the input image is corrected on the basis of a location of the object detected through the object detecting process. Specifically, a region required for the correction is determined using the result of detecting the object, and then the input image is subject to a correction (contrast enhancement) based on the determined region. Therefore, the present invention can support a state where the contrast is locally lowered, such as when a dark object is in a dark place, and achieve object detection that suppresses an alarm from being failed to be reported or erroneously reported.

According to the present invention, in the object detecting process, a background image is updated every time an input image is captured. Here, the background image is a target to be compared with the input image in detecting an object. In the preprocessing, a corrected amount of the input image is adjusted in accordance with the update proportion of the background image in the object detecting process. Specifically, in the preprocessing, the background update proportion, which indicates a rate of learning a background in the object detecting process, is referred to, and the corrected amount (the degree of the contrast enhancement) for the input image of a single frame is restricted in such a way that the preprocessing can follow the learning rate for the background image in the object detecting process. As a result, an image in which a great level (luminance) difference is not generated in a background part such as a building is created as a corrected image. This can also support a case where the luminance level between frames is changed suddenly, for example, which would occur at the moment when the contrast enhancement is switched from an off state (stop) to an on state (start) or from an on state (start) to an off state (stop).

According to the present invention, a more specific configuration is that the correction characteristic information contains a maximum level width, which is the maximum value of widths between the luminance levels at the falling and rising parts of a cumulative frequency, the cumulative frequency being created by accumulating, in luminance levels, the appearance frequencies for respective luminance levels in the corrected input image. In addition, in the object detecting process, a binary threshold determined on the basis of the above maximum level width is used to binarize the corrected input image, and then this binary image is used to detect an object. Here, the maximum level width represents the maximum level of noises generated by the correction (contrast enhancement) of the input image. Therefore, since an object is detected using the corrected input image that has been binarized with the binary threshold based on the maximum level width, it is possible to reduce an influence of noises enhanced by the contrast enhancement.

According to the present invention, a region required for a correction is determined on the basis of a difference image (binary image C in Embodiment) between respective corrected input images (binary images A and B in Embodiment) that have been binarized with a binary threshold based on the maximum level width and another binary threshold that is lower than the above threshold. In this way, it is possible to apply the contrast enhancement to a part in which a low contrast is generated locally.

With the present invention, an object can be detected stably even when the contrast of an image is lowered overall or partially.

DETAILED DESCRIPTION

Embodiment of the present invention will be described with reference to the drawings.

Figure 1:
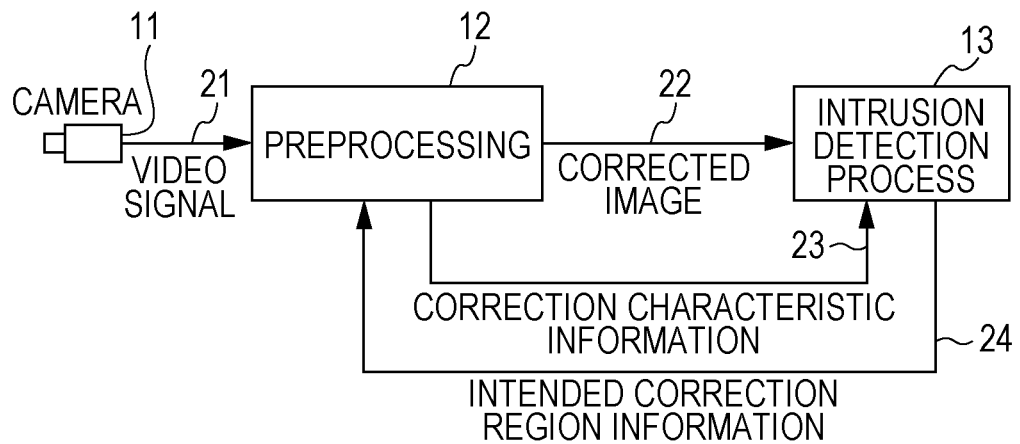
FIG. 1 is a view showing an exemplary configuration of an intrusion detection system according to an embodiment of the present invention.

FIG. 1 shows an exemplary configuration of an intrusion detection system according to an embodiment of the present invention.

The intrusion detection system in the embodiment receives a video signal 21 from a camera 11 photographing a monitor region, to obtain input images at predetermined frame intervals, then uses a preprocessing section 12 to enhance the contrast of the input images, and uses an intrusion detection processing section 13 to analyze a corrected image 22 obtained as a result of the contrast enhancement. In this way, the intrusion detection system attempts to improve the accuracy of detecting an object that has invaded the monitor region. Furthermore, the preprocessing section 12 outputs correction characteristic information 23 to the intrusion detection processing section 13. The intrusion detection processing section 13 outputs intended correction region information 24 to the preprocessing section 12. This makes up a configuration that can detect an intruding object while suppressing an alarm for an intruding object from being failed to be reported or erroneously reported.

The following description will be given regarding an example in which an intruding object targeted for detection is a person (intruder); however any other intruding object may be detected.

A description will be given of configurations of the preprocessing section 12 and the intrusion detection processing section 13.

Figure 2:
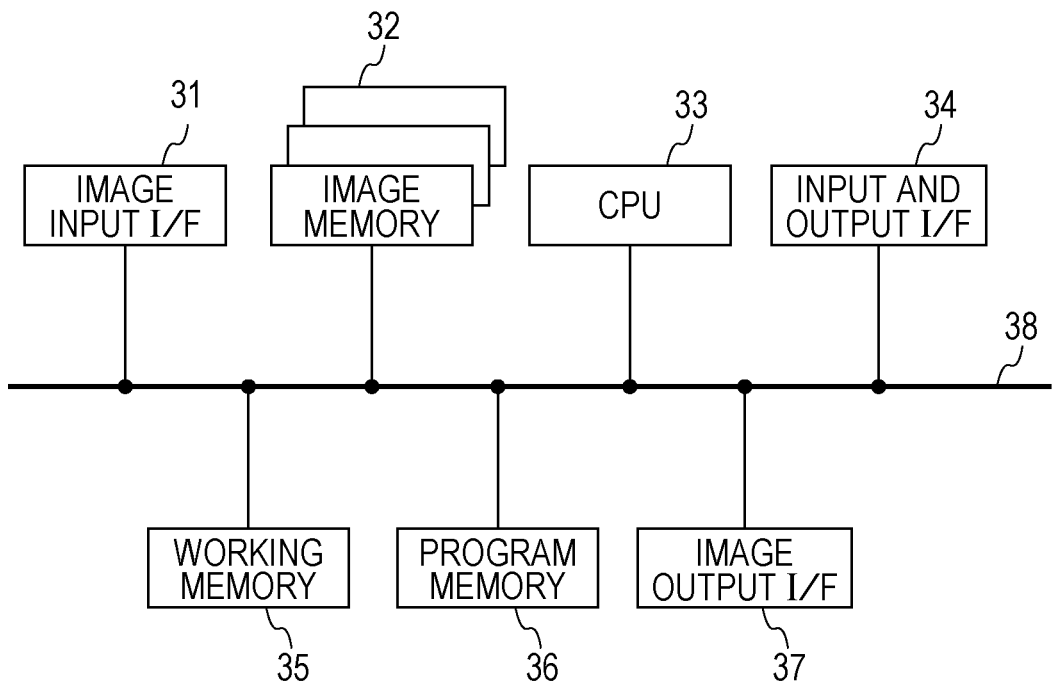
FIG. 2 is a view showing an exemplary hardware configuration of an intrusion detection device according to the embodiment.

FIG. 2 shows an exemplary hardware configuration of an intrusion detection device (an exemplary object detection device according to the present invention) in which the preprocessing section 12 and the intrusion detection processing section 13 are integrated with each other. However, the preprocessing section 12 and the intrusion detection processing section 13 may be configured to be provided in separated devices that can communicate with each other.

The intrusion detection device in the embodiment is implemented using a computer that includes: an image input I/F 31 that converts the analog video signal 21 obtained from the camera 11 into a digital video signal (A/D conversion) and provides input images each of which is expressed by a luminance signal having a predetermined tone number (256 tones ranging from 0 to 255 in the embodiment); an image memory 32 that is used to make a calculation between the images and store these; a CPU 33 (Central Processing Unit) that performs an image analyzing process (including processes performed by the preprocessing section 12 and the intrusion detection processing section 13); an input and output I/F 34 that receives command signals and the like from the outside and transmits alarm signals and the like to the outside; a working memory 35 that serves as a working region for the CPU 33; a program memory 36 that stores a program for the above image analyzing process; an image output I/F 37 that converts the digital images stored in the image memory 32 into an analog video signal (D/A conversion) and outputs it to the outside (e.g., monitor screen); and a data bus 38 through which the above functional units 31 to 37 transfer data.

An operation of the preprocessing section 12 will be described with reference to a process flow exemplified in FIG. 3.

In an input image capturing process (Step S11), first, the preprocessing section 12 stores the input image, which has been obtained by subjecting the video signal 21 from the camera 11 to the A/D conversion in the image input I/F unit 31, in an input image memory region in the image memory 32.

In a first time determining process (Step S12), then, the preprocessing section 12 determines whether or not the current process is the first one (e.g., a process at the moment when the power source is switched from an off state to an on state).

If the current process is determined to be the first one in the first time determining process (Step S12), the preprocessing section 12 performs a correction base (entire) image registering process (Step S13), a background update proportion request command output process (Step S14), and a correction region initializing process (Step S15). If the current process is determined not to be the first one in the first time determining process (Step S12), the preprocessing section 12 skips these processes (Steps S13 to S15).

In the correction base (entire) image registering process (Step S13), the preprocessing section 12 copies the input image stored in the input image memory region in the image memory 32 into a correction base (entire) image memory region of the image memory 32, thereby obtaining a correction base (entire) image. In the background update proportion request command output process (Step S14), the preprocessing section 12 outputs a command for requesting a background update proportion to the intrusion detection processing section 13.

In the correction region initializing process (Step S15), an entire screen is set as a correction region that will become a target in a contrast correcting process (Step S21) to be described later. Here, the screen corresponds to the input image.

In a background update proportion preregistration determining process (Step S16), the preprocessing section 12 determines whether to have received, from the intrusion detection processing section 13, a response to the command for requesting a background update proportion which was output during the background update proportion request command output process (Step S14).

If no response is determined to be received from the intrusion detection processing section 13 in the background update proportion preregistration determining process (Step S16), the preprocessing section 12 performs an output image creating (non-correction) process (Step S26).

In the output image creating (non-correction) process (Step S26), the preprocessing section 12 copies the input image stored in the input image memory region in the image memory 32 into an output image memory region in the image memory 32, thereby obtaining an output image. After the output image creating (non-correction) process (Step S26), the preprocessing section 12 moves the current process to a video output process (Step S23) that will be described later.

If the response is determined to be received from the intrusion detection processing section 13 during the background update proportion preregistration determining process (Step S16), the preprocessing section 12 performs a background update proportion registration process (Step S17).

In the background update proportion registration process (Step S17), the preprocessing section 12 registers a background update proportion responded by the intrusion detection processing section 13. If the background update proportion has already been registered, the preprocessing section 12 skips the background update rate registration process (Step S17).

In a correction region reception determining process (Step S18), the preprocessing section 12 determines whether to have received the intended correction region information 24 from the intrusion detection processing section 13.

If the intended correction region information 24 is determined to be received from the intrusion detection processing section 13 during the correction region reception determining process (Step S18), the preprocessing section 12 performs a correction base image (only correction region) registering process (Step S19) and a correction region registering process (Step S20).

In the correction base image (only correction region) registering process (Step S19), the preprocessing section 12 cuts out only a part corresponding to a correction region indicated by the intended correction region information 24, from the correction base (entire) image obtained during the correction base (entire) image registering process (Step S13). Then, the preprocessing section 12 copies the cutout part into a correction base image (only correction region) memory region in the image memory 32, thereby obtaining a correction base image (only correction region). If the contrast correction was applied to an entire previous input image in the contrast correcting process (Step S21) that will be described later, the preprocessing section 12 cuts out the correction region part from this result, thereby obtaining the correction base image (only correction region).

In the correction region registering process (Step S20), the preprocessing section 12 registers the correction region indicated by the intended correction region information 24, as a correction region that will become a target in the contrast correcting process (Step S21) to be described below.

In the contrast correcting process (Step S21), the preprocessing section 12 makes a contrast correction (enhancement) by using data concerning the correction region registered during the correction region registering process (Step S20), the correction base (entire) image registered during the correction base (entire) image registering process (Step S13), the correction base image (only correction region) registered during the correction base image (only correction region) registering process (Step S19), the input image captured during the input image capturing process (Step S11), and the background update proportion registered during the background update proportion registration process (Step S17). As a result of this, the preprocessing section 12 obtains a contrast-enhanced image. Details of this process will be described later.

In an output image creating process (Step S22), the preprocessing section 12 copies the contrast-enhanced image obtained during the contrast correcting process (Step S21) into the output image memory region in the image memory 32, thereby obtaining the output image.

In the video output process (Step S23), the preprocessing section 12 outputs the output image (contrast-enhanced or input image) stored in the output image memory region in the image memory 32 to the intrusion detection processing section 13, as the corrected image 22.

In a command output interval determining process (Step S24), the preprocessing section 12 determines a time that has elapsed since the previous command transmission.

If it is determined that the time which has elapsed since the previous command transmission is shorter than a preset time (T sec), in the command output interval determining process (Step S24), the preprocessing section 12 returns the current process to the input image capturing process (Step S11).

If it is determined that the time which has elapsed since the previous command transmission is as long as or longer than the preset time (T sec), in the command output interval determining process (Step S24), the preprocessing section 12 performs a correction characteristic information output process. Then, the preprocessing section 12 returns the current process to the input image capturing process (Step S11).

In the correction characteristic information output process (Step S25), the preprocessing section 12 outputs the correction characteristic information 23 to the intrusion detection processing section 13. The correction characteristic information 23 contains information that indicates image characteristics regarding the contrast correction (enhancement), as will be described later. It is believed to be sufficient for the frequency of outputting the correction characteristic information 23 to be once in several seconds, for example, in consideration of a low degree to which the luminance level changes over one frame and prevention of a heavy load on the command transmission and reception.

Details of the contrast correcting process (Step S21) will be described with reference to FIGS. 4(a) to 4(e).

FIGS. 4(a) to 4(e) show a basic manner of the contrast enhancement.

Figure 4:
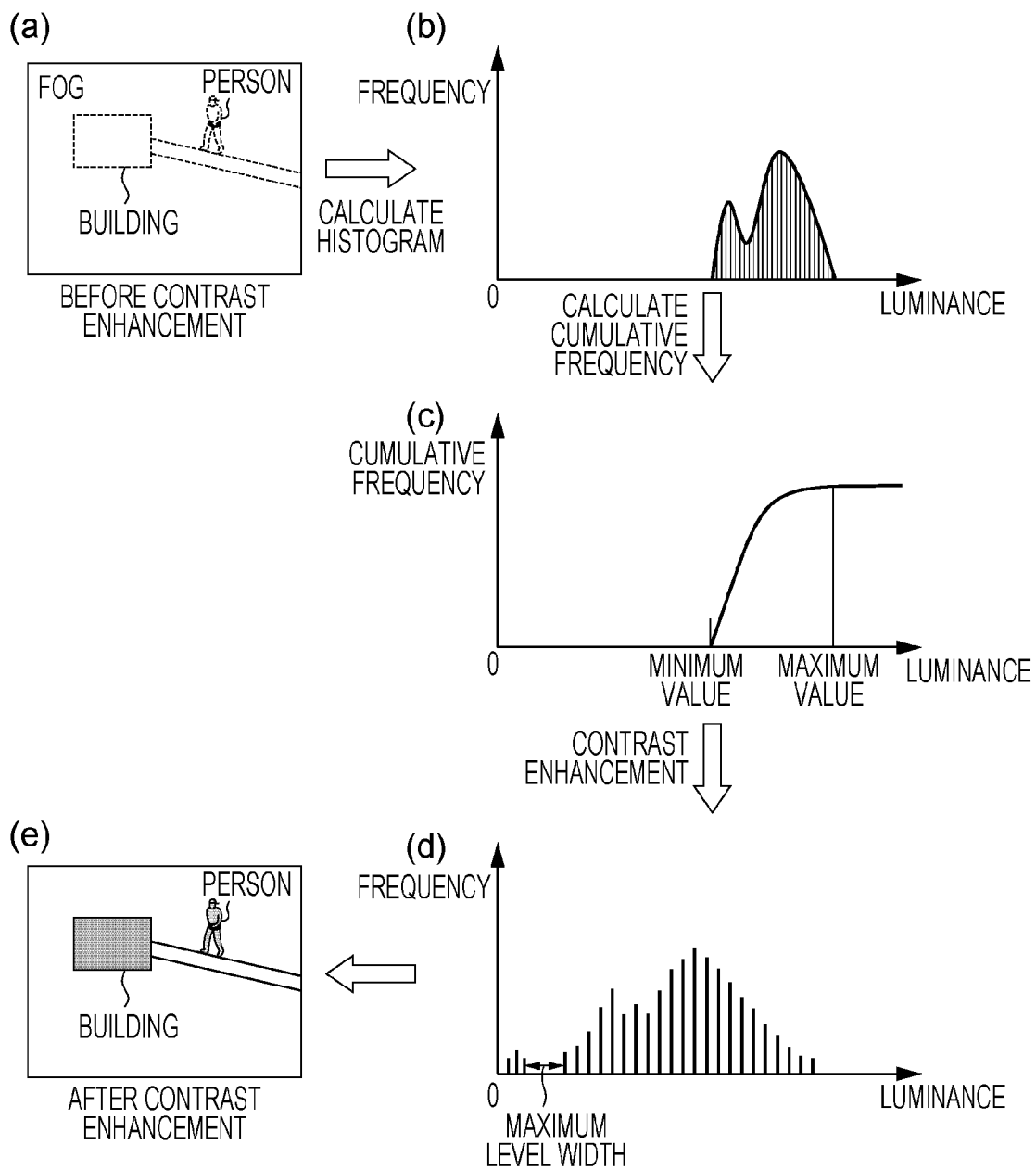
FIGS. 4(a) to 4(e) are views showing a basic manner of contrast enhancement according to the embodiment.

First, for the input image before the contrast enhancement as exemplified in FIG. 4(a), the frequency of appearance (the number of corresponding pixels) for each luminance level (256 tones ranging from 0 to 255 in the embodiment) is calculated. As a result, a histogram as exemplified in FIG. 4(b) is obtained.

Next, for this histogram, the cumulative frequency for each luminance level is calculated.

The cumulative frequency for each luminance level is calculated as follows. Here, the numbers inside the parentheses represent luminance levels.

Cumulative frequency (0)=frequency of luminance (0)

Cumulative frequency (1)=frequency of luminance (0)+frequency of luminance (1)

. . .

Cumulative frequency (127)=sum of frequencies of luminance (0) to luminance (127)

. . .

Cumulative frequency (255)=sum of frequencies of luminance (0) to luminance (255)

By plotting the cumulative frequency for each luminance level, a cumulative frequency graph as exemplified in FIG. 4(c) is created.

Next, the minimum and maximum values of the cumulative frequency are calculated from the cumulative frequency for each luminance level. The minimum value corresponds to the value (cumulative frequency) of the rising part which exceeds the cumulative frequency (0); the maximum value corresponds to the first value of the parts at which the cumulative frequency is equal to an image size (width× height). The bias of the luminance level in the input image can be judged from the minimum and maximum values of the cumulative frequency.

For example, assuming that the contrast is lowered due to fog or the like as shown in FIG. 4(a), the frequency distribution in which the luminance level is biased toward the higher part (part close to luminance level=255) is made as shown in FIG. 4(b) or 4(c). Assuming that the contrast is lowered due to darkness or the like, the frequency distribution in which the luminance level is biased toward the lower part (part close to luminance level=0) is made.

Next, the luminance value (luminance level) at each pixel in the input image is converted through equation 1 and using the cumulative frequency for each luminance level and the minimum and maximum values of the cumulative frequency that have been obtained from the above procedure. In this way, the contrast enhancement is performed.

[Equation 1]

$$O[i,j]=(D(I[i,j])-D_{min}(H))\times 255/\text{Diff} \quad \text{(Equation 1)}$$

In this equation, I[i, j] denotes a luminance value at each pixel before contrast enhancement, and O[i, j] denotes a luminance value at each pixel after contrast enhancement. Furthermore, D(I[i, j]) denotes the cumulative frequency of the luminance values of I[i, j], $D_{min}$(H) denotes the minimum value of the cumulative frequency, and Diff denotes a value obtained by subtracting the minimum value of a cumulative frequency from the maximum value thereof.

As a result of performing the contrast enhancement through the above equation 1, the histogram as exemplified in FIG. 4(d) is obtained. Specifically, the frequency distribution that has been biased in the vicinity of a certain luminance level can be made more evenly over the range where the luminance level can be obtained. Consequently, as exemplified in FIG. 4(e), it is possible to enhance the contrast of low-contrast parts (with a small luminance difference), such as a building and an object (person) (expand the range of the luminance difference).

If an area (range (i, j)) targeted for the contrast enhancement using the above equation 1 is set to the entire screen, the entire contrast enhancement can be performed. If the target area is partially set to the screen, the local contrast enhancement can be performed.

Figure 3:
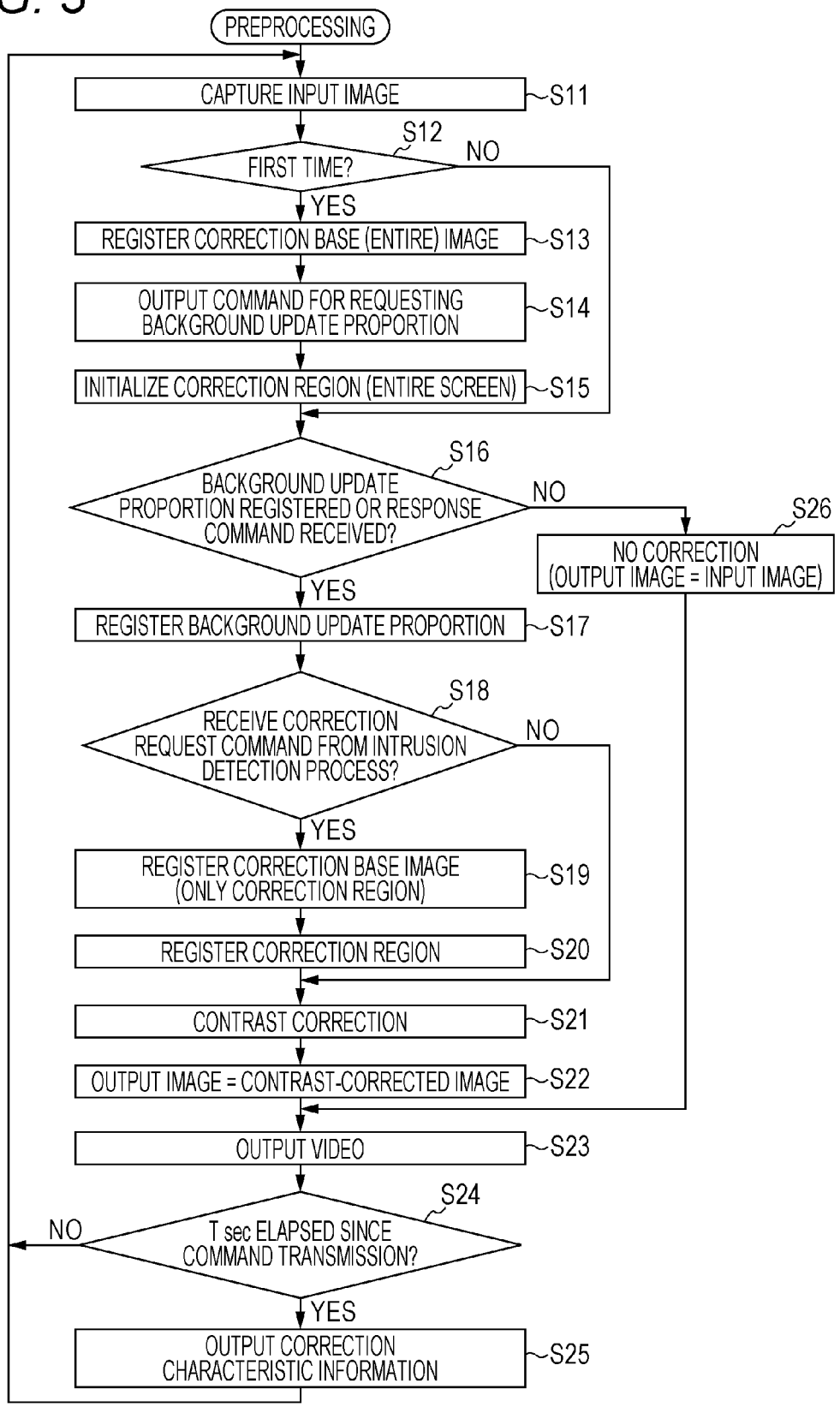
FIG. 3 is a view showing an exemplary process flow in a preprocessing section according to the embodiment.

In the contrast correcting process (Step S21), the process (contrast enhancement) described with reference to FIG. 3 is performed on the basis of the intended correction region information 24 from the intrusion detection processing section 13. More specifically, a correction region indicated by the intended correction region information 24 is subjected to the contrast enhancement. Then, the resultant contrast-enhanced image for each correction region is copied into the input image. This makes it possible to obtain the contrast-enhanced image (corrected image 22), which is a result of applying the contrast enhancement to the whole or part of the screen.

The whole and part of a screen may be designated in combination as correction regions. In this case, for example, the whole and part of the screen are subject separately to the contrast enhancement. First the entire screen contrast-enhanced image is copied into the input image (entire replacement), and then the partial screen contrast-enhanced image is copied into the corresponding part of the screen (partial replacement). This makes it possible to obtain a contrast-enhanced image (corrected image 22), which is created through the application of the contrast enhancement to both the entire and part of the screen. Alternatively, first the contrast enhancement may be applied to the entire screen, and then the contrast enhancement may be further applied to the part of the screen of the resultant entire screen contrast-enhanced image. The contrast-enhanced image (corrected image 22) created in this manner could be more suitable for the intrusion detection to be made by the downstream intrusion detection processing section 13, depending on the state of the input image.

The luminance level significantly changes in the part in which an intruder is present as well as the part of a background such as a building, at the moment when the contrast enhancement is switched from an off state (stop) to an on state (start) or from an on state (start)) to an off state (stop). In the embodiment, therefore, a contrast-enhanced image (corrected image 22) is created by calculating the weighted average of a correction base image and a contrast-enhanced image (through equation 2) instead of simply copying the contrast-enhanced image. Then, this contrast-enhanced image is used for the intrusion detection by the intrusion detection processing section 13. In this way, the embodiment attempts to prevent erroneous detection in a background such as a building. Here, the correction base (entire) image and the correction base image (only correction region) are selectively used as the correction base image, depending on the target correction region.

Contrast-enhanced image=correction base image×(1−background update proportion)+contrast-enhanced image×background update proportion  (Equation 2)

Specifically, a contrast-enhanced image is created such that the contributing proportion of a contrast-enhanced image increases as the background update proportion increases.

According to the embodiment, in the correction characteristic information output process (Step S25), a histogram is created for the contrast-enhanced image (corrected image 22) again. Then, the maximum level width is calculated, which corresponds to the maximum value of the widths of zones in which no cumulative frequency is present (widths between the rising and falling parts of the cumulative frequency) is calculated. This maximum level width represents the maximum level of noises generated by the histogram enhancement, as shown in FIG. 4(d). The maximum level width is stored in the correction characteristic information 23, output to the intrusion detection processing section 13, and used to determine a binary threshold in the process performed by the intrusion detection processing section 13.

The correction characteristic information 23 also contains the minimum luminance, the maximum luminance, and the maximum level difference, as other pieces of information that indicates image characteristics regarding a contrast correction (enhancement). The minimum luminance refers to a luminance level at which a cumulative frequency is minimized before contrast enhancement; the maximum luminance refers to a luminance level at which a cumulative frequency is maximized before contrast enhancement. The maximum level difference refers to the maximum difference in luminance level between a contrast-enhanced image (corrected image 22) and a contrast-enhanced image.

Figure 5:
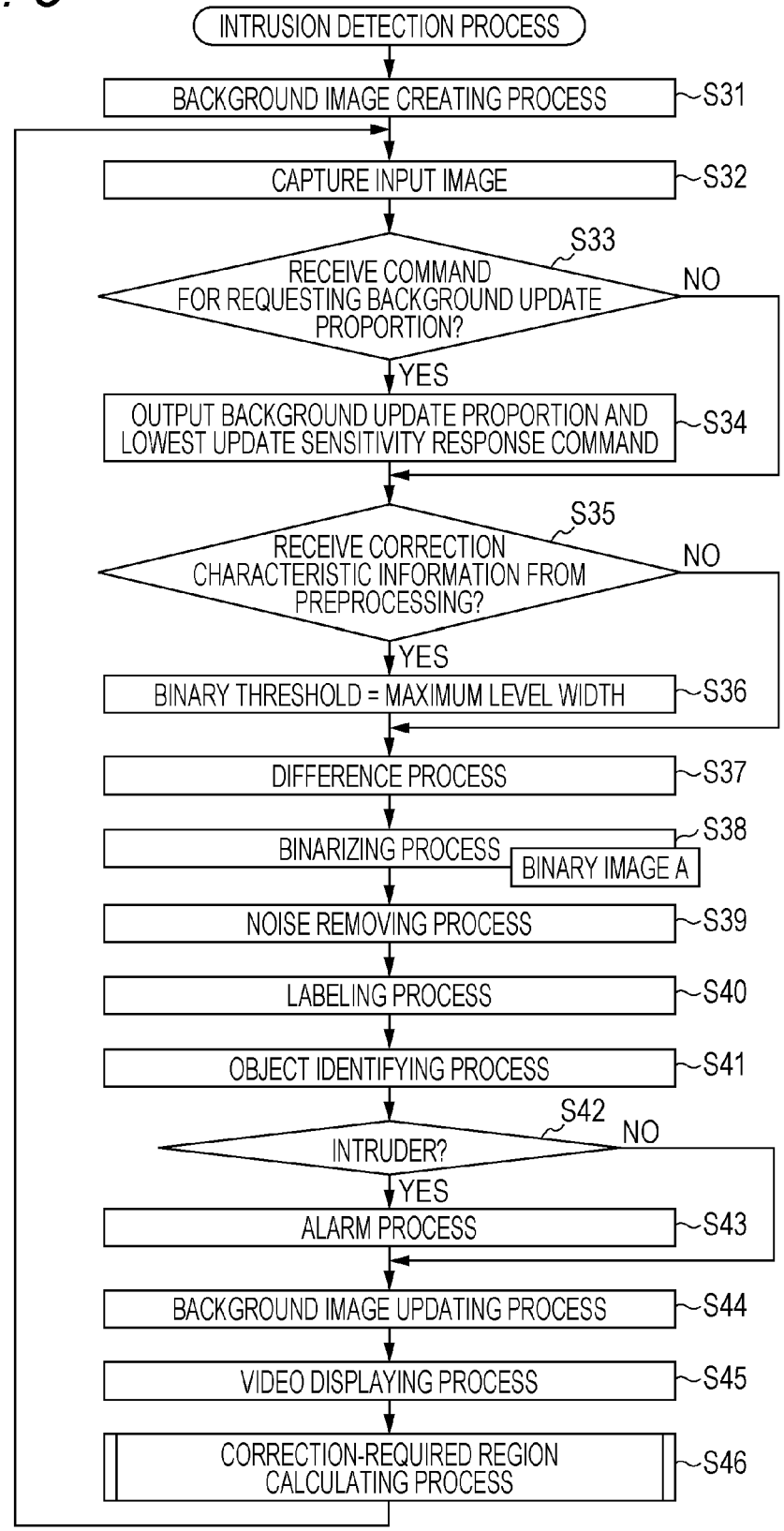
FIG. 5 is a view showing an exemplary process flow in an intrusion detection processing section according to the embodiment.

An operation of the intrusion detection processing section 13 will be described with reference to a process flow exemplified in FIG. 5.

In a background image creating process (Step S31), first, the intrusion detection processing section 13 creates the background image to be used for the intrusion detection. The background image in which an object (intruder) targeted for detection is not present is created by determining a weighted average of a plurality of temporally different input images (corrected images 22). The background image can be created using the technique disclosed in JP 2009-282975 A.

After completing the creation of the background image in the background image creating process (Step S31), the intrusion detection processing section 13 captures a new input image (corrected image 22) in an input image capturing process (Step S32).

In the background update proportion request command reception determining process (Step S33), the intrusion detection processing section 13 determines whether to have received the command for requesting the background update proportion from the preprocessing section 12.

If the command for requesting the background update proportion is determined to have received in the background update proportion request command reception determining process (Step S33), the intrusion detection processing section 13 performs a background update proportion response command output process (Step S34). If the command for requesting the background update proportion is determined not to have received in the background update proportion request command reception determining process (Step S33), the intrusion detection processing section 13 skips the background update proportion response command output process (Step S34).

In the background update proportion response command output process (Step S34), the intrusion detection processing section 13 reports the background update proportion to the preprocessing section 12, as a response to the command for requesting the background update proportion. This background update proportion response command output process (Step S34) is performed at intervals of the activation of the preprocessing section 12 (only once basically), because the intrusion detection processing section 13 outputs the command for requesting the background update proportion only once when the preprocessing section 12 is activated. The background update proportion is a value calculated from the comparison between background images at the time of the previous command for requesting the background update proportion and at the present time (at the time of the present command for requesting the background update proportion). Thus, the background update proportion indicates the degree of the difference between individual background images.

In a correction characteristic information reception determining process (Step S35), the intrusion detection processing section 13 determines whether to have received the correction characteristic information 23 from the preprocessing section 12.

If the correction characteristic information 23 is determined to have received in the correction characteristic information reception determining process (Step S35), the intrusion detection processing section 13 performs a binary threshold registering process (Step S36). If the correction characteristic information 23 is determined not to have received in the correction characteristic information reception determining process (Step S35), the intrusion detection processing section 13 skips the binary threshold registering process (Step S36).

In the binary threshold registering process (Step S36), the maximum level width indicated by the correction characteristic information 23 is registered as the binary threshold. Setting the maximum level width as the binary threshold enables the binary process to be performed using a threshold equal to or greater than a noise level, thus eliminating the influence of noises. Since the detection level for an object is enhanced so that it becomes equal to or greater than the noise level, there is no effect of a detection failure. In the embodiment, the maximum level width by itself is used as the binary threshold; however there is no limitation on the binary threshold. Alternatively, a value adjusted, for example, by multiplying the maximum level width by a preset coefficient may be used, provided that it can eliminate effectively an influence of noises.

After that, the intrusion detection processing section 13 performs a difference process (Step S37), a binarizing process (Step S38), a noise removing process (Step S39), and a labeling process (Step S40).

In the difference process (Step S37), the intrusion detection processing section 13 calculates the difference between the background image obtained through the background image creating process (Step S31) and the input image (corrected image 22) obtained through the input image capturing process (Step S32). Then, the intrusion detection processing section 13 creates a difference image (input image−background image). The difference between the input image (corrected image 22) and the background image may be calculated as either a signed or absolute value. It should be noted that when a background image updating process (Step S44), which will be described later, is performed, the background image updated in the background image updating process (Step S44) may be used to create a difference image.

In the binarizing process (Step S38), the intrusion detection processing section 13 binarizes the difference image obtained through the difference process (Step S37) by using the binary threshold registered through the binary threshold registering process (Step S36). In this way, the intrusion detection processing section 13 creates a binary image. More specifically, the intrusion detection processing section 13 creates the binary image by converting a luminance value at a pixel which is lower than the binary threshold into 0 and a luminance value at a pixel which is equal to or greater than the binary threshold into 255.

In the noise removing process (Step S39), the intrusion detection processing section 13 removes noises contained in the binary image created through the binarizing process (Step S38), thereby creating a noise-removed image. In the embodiment, out of clusters of pixels contained in the binary image, ones in which the number of pixels is smaller than a preset number are regarded as noises and removed.

In the labeling process (Step S40), the intrusion detection processing section 13 regards the clusters of pixels which have been left in the noise-removed image created through the noise removing process (Step S39), as objects. Then, the intrusion detection processing section 13 assigns a label (identification information) to each object (cluster), and calculates its width, height, and area.

In an object identifying process (Step S41), the intrusion detection processing section 13 identifies the type of each object obtained through the labeling process (Step S40), on the basis of its size, staying time, moving distance, and the like. The size of an object can be determined, for example, on the basis of its width, height and area obtained through the labeling process (Step S40). The staying time of an object can be determined, for example, on the basis of the number of ones of a plurality of temporally different input images (frames) from which the object has been detected. The moving distance of an object can be determined, for example, on the basis of information regarding the locations of the object in a plurality of temporally different input images.

In an intruder identifying process (Step S42), the intrusion detection processing section 13 identifies whether or not one of the objects identified through the object identifying process (Step S41) is a person (intruder). If one of the objects is determined to be an intruder, the intrusion detection processing section 13 performs an alarm process in which an external apparatus outputs an alarm, for example, by lighting a Patlite (registered trademark) lamp, sounding a buzzer, or telling a server, in an alarm process (Step S43).

After that, the intrusion detection processing section 13 performs the background image updating process (Step S44), a video displaying process (Step S45), and a correction-required region calculating process (Step S46).

In the background image updating process (Step S44), the intrusion detection processing section 13 updates the background image. The update of the background image is executed every time the input image (corrected image 22) is captured, in order to follow the temporal, continuous state change in the video.

In the video displaying process (Step S45), the intrusion detection processing section 13 subjects the input image (corrected image 22) to a D/A conversion by using the image output I/F 37. Then, the intrusion detection processing section 13 outputs the analog input image to a monitor that an observer is watching, and then displays it on the monitor. If the intruder is present, the intrusion detection processing section 13 superimposes letters "intruder detected," a marker indicating the detected location, and the like onto the input image (corrected image 22), and then outputs it (intruder-information-added image) to the monitor.

In the correction-required region calculating process (Step S46), the intrusion detection processing section 13 checks the presence of a region in which the contrast locally decreases, because a person in black clothing is present in a dark part in this region, for example. Then, the intrusion detection processing section 13 stores information regarding the above region (low-contrast region) in the intended correction region information 24, and transmits it to the preprocessing section 12. This can subject apart in which the contrast state locally decreases to the contrast enhancement.

Details of the correction-required region calculating process (Step S46) will be described with reference to the process flow exemplified in FIG. 6.

In a correction necessity determining process (Step S51), first, the intrusion detection processing section 13 determines the need to apply the contrast enhancement to the entire screen.

More specifically, the intrusion detection processing section 13 calculates a luminance difference, which is a difference between the minimum luminance and the maximum luminance indicated by the correction characteristic information 23. Then, if the luminance difference is small (or is smaller than a preset reference difference value) and the entire screen is not registered as the correction region, the intrusion detection processing section 13 determines that applying the contrast enhancement to the entire screen is needed.

If applying the contrast enhancement to the entire screen is determined to be needed in the correction necessity determining process (Step S51), the intrusion detection processing section 13 performs a correction region quantity increment process (Step S52) and an entire correction region registering process (Step S53). If applying the contrast enhancement to the entire screen is determined not to be needed in the correction necessity determining process (Step S51), the intrusion detection processing section 13 skips both the correction region quantity increment process (Step S52) and the entire correction region registering process (Step S53).

In the correction region quantity increment process (Step S52), the intrusion detection processing section 13 increments the number n of correction regions by 1. Here, the number n of correction regions has been preset to 0 as an initial value.

In the entire correction region registering process (Step S53), the entire screen is registered as an n-th correction region.

Figure 6:
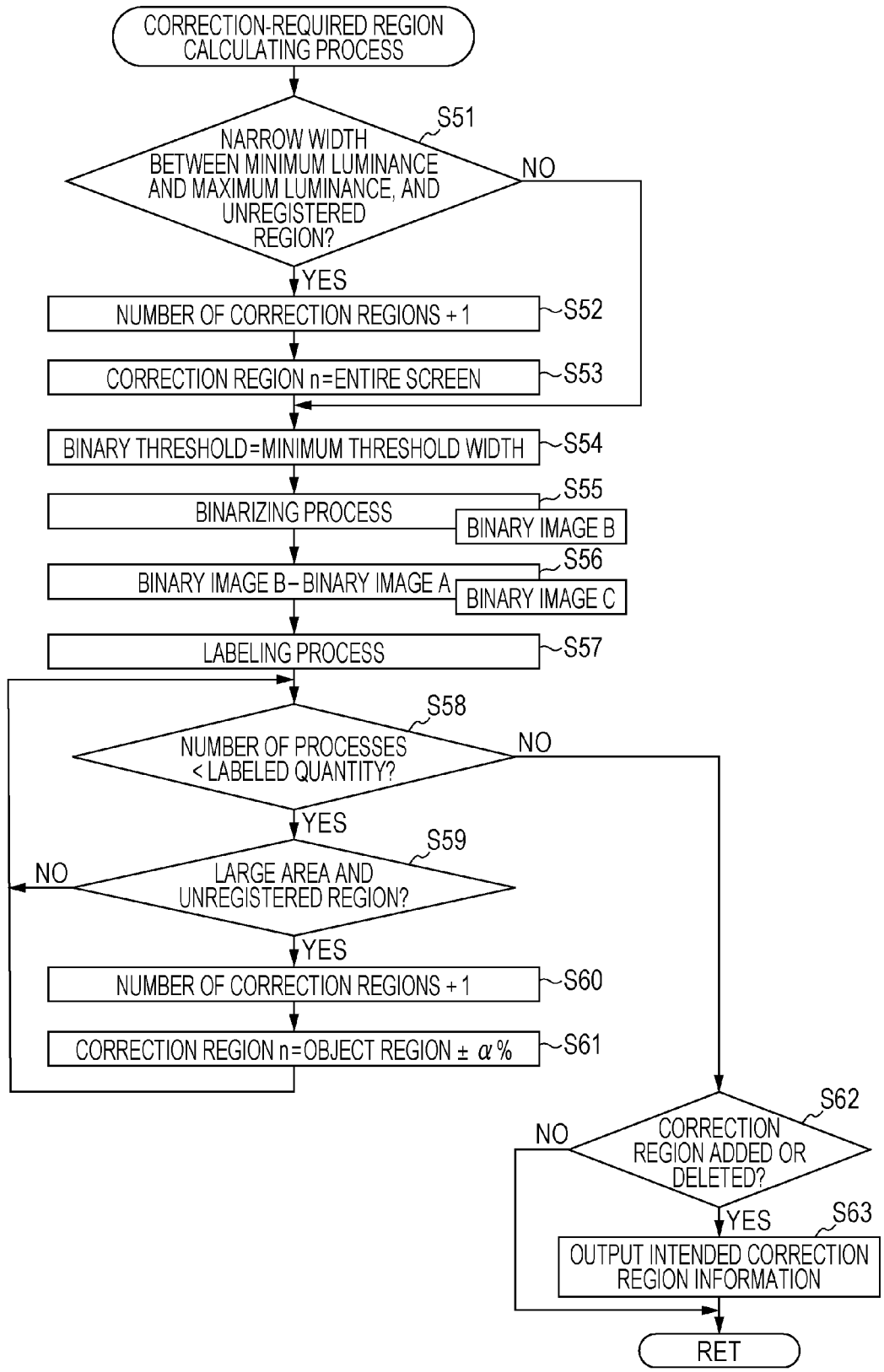
FIG. 6 is a view showing an exemplary process flow in a correction-required region calculating process according to the embodiment.

Although not shown in the process flow in FIG. 6, if the entire screen has already been registered as the correction region and the luminance difference between the minimum luminance and the maximum luminance is not small (or equal to or greater than the preset reference difference value), the intrusion detection processing section 13 deletes the entire screen from the correction region, and decrements the number of correction regions by 1.

Next, the intrusion detection processing section 13 performs a binary threshold registering process (Step S54), a binarizing process (Step S55), a correction region extracting process (Step S56), and a labeling process (Step S57).

In the binary threshold registering process (Step S54), the intrusion detection processing section 13 presets a minimum threshold required to calculate a correction required region, and sets this minimum threshold as a binary threshold. The usable minimum threshold is lower than the binary threshold registered through the binary threshold registering process (Step S36).

In the binarizing process (Step S55), the intrusion detection processing section 13 binarizes the difference image obtained through the difference process (Step S37) by using the binary threshold registered through the binary threshold registering process (Step S55), thereby creating a binary image. More specifically, the intrusion detection processing section 13 creates the binary image by converting the luminance value at a pixel which is lower than the binary threshold into 0 and the luminance value at a pixel which is equal to or greater than the binary threshold into 255.

In the correction region extracting process (Step S56), the intrusion detection processing section 13 sets the binary image created through the binarizing process (Step S38) to a binary image A and the binary image created through the binarizing process (Step S56) to a binary image B. Then, the intrusion detection processing section 13 calculates the difference between the binary images A and B, thereby creating a binary image C, which corresponds to a difference image between the binary images A and B.

In the labeling process (Step S57), the intrusion detection processing section 13 applies a labeling process to the binary image C obtained through the correction region extracting process (Step S56). Then, the intrusion detection processing section 13 regards clusters of pixels contained in the binary image C as objects, assigns a label (identification information) to each cluster, and calculates its width, height and area.

In a process frequency determining process (Step S58), the intrusion detection processing section 13 initializes a labeling post-process frequency so that it becomes 0, and then determines whether or not the number of labeling post-processes is smaller than a labeled quantity. Here, the labeled quantity refers to the number of objects labeled during the labeling process (Step S57). The number of labeling post-processes is incremented by 1 every time the subsequent correction region determining process (Step S59) is performed. Specifically, in the process frequency determining process (Step S58), the intrusion detection processing section 13 determines whether or not all the labeled objects have been subjected to the correction region determining process (Step S59).

If the number of labeling post-processes is determined to be smaller than the labeled quantity (any unprocessed, labeled object is present) in the process frequency determining process (Step S58), the intrusion detection processing section 13 performs the correction region determining process (Step S59).

In the correction region determining process (Step S59), the intrusion detection processing section 13 determines the need to apply the contrast enhancement (contrast) to each objet labeled through the labeling process (Step S57). More specifically, if the area of an object which has been obtained during the labeling process (Step S57) (or the area is equal to or larger than a preset reference area value) and this object is not registered as the correction region, the intrusion detection processing section 13 determines that the image part of the object needs a local contrast correction.

If the local contrast correction is determined to be needed in the correction region determining process (Step S59), the intrusion detection processing section 13 further performs a correction region quantity increment process (Step S60) and a local correction region registering process (Step S61).

In the correction region quantity increment process (Step S60), the intrusion detection processing section 13 increments the number n of correction regions by 1.

In the local correction region registering process (Step S61), the intrusion detection processing section 13 registers a region (expanded region) created by expanding the width and height obtained through the labeling process (Step S57) by a preset positive or negative value ($\alpha$ %), as the n-th correction region (local correction region).

Although not shown in the process flow in FIG. 6, if any object, which has been obtained through the labeling process (Step S57) and related to a correction region registered through the local correction region registering process (Step S61), continues to have a small number of pixels (or the number of pixels being smaller than a preset reference pixel quantity) over a predetermined time (several seconds), the intrusion detection processing section 13 deletes the region (expanded region) related to this object from the correction region, and decrements the number of correction regions by 1.

If the labeling post-process frequency is determined to exceed the labeled quantity in the process frequency determining process (Step S58), or if all the labeled objects have been subjected to the correction region determining process (Step S59), the intrusion detection processing section 13 performs a correction region addition/deletion determining process (Step S62).

In the correction region addition/deletion determining process (Step S62), the intrusion detection processing section 13 compares the number of correction regions in the previously processed frame (previously processed input image) with that in the currently processed frame (currently processed input image). The intrusion detection processing section 13 thereby determines whether or not the number of correction regions has been changed.

If the number of correction regions is determined to have been changed, in the correction region addition/deletion determining process (Step S62), the intrusion detection processing section 13 performs a correction region information output process (Step S64). If the number of correction regions is determined not to have been changed, in the correction region addition/deletion determining process (Step S62), the intrusion detection processing section 13 skips the correction region information output process (Step S64).

In the correction region information output process (Step S64), the intrusion detection processing section 13 transmits information regarding the regions that have been registered as the correction regions to the preprocessing section 12 as the intended correction region information 24.

The above-described processes can tailor contrast enhancement to intrusion detection.

The configurations of the system, device and the like according to the present invention are not limited to those described above, and may employ various configurations. Moreover, the present invention can be provided in the form of a method or scheme for performing the processes according to the present invention, a program for implementing this method or scheme, a recording medium storing this program, or the like. Alternatively, the present invention can be provided in the form of any type of system or device.

Application fields of the present invention do not necessarily have to be limited to those described above, and it is applicable to various fields.

The series of processes performed by the system, device and the like according to the present invention may be configured to be controlled, for example, by a processor, which is provided in a hardware resource including the processor and memories, executing a control program stored in ROM (Read Only Memory). In addition, for example, functional means for performing these processes may be configured with one or more independent hardware circuits.

The present invention can be recognized as a computer-readable medium, such as a floppy (registered trademark) disk or a CD (Compact Disc)-ROM, that stores the above control program, or this program (by itself). Specifically, by inputting the control program in a computer through the recording medium and causing the processor to execute this program, the processes according to the present invention can be performed.

The present invention effectively functions when visibility is poor due to fog, mist or smoke, and also becomes effective in typical image monitor systems. Application of the present invention is not limited to an image monitor field, and it is applicable to various systems that enable images to be browsed.

REFERENCE SIGNS LIST 11 camera
12 preprocessing section
13 intrusion detection processing section
21 video signal (input image)
22 corrected image
23 correction characteristic information
24 intended correction region information
31 image input I/F
32 image memory
33 CPU
34 input and output I/F
35 working memory
36 program memory
37 image output I/F
38 data bus

What is claimed is:
1. An object detection device which detects an object that has emerged within a monitoring region, on a basis of an input image from a camera photographing the monitoring region, the object detection device comprising:
 a preprocessor that corrects an input image by enhancing a contrast of an input image, and adjusts an enhancing amount in the contrast of the input image, wherein the enhancing amount increases with increasing a learning rate of a background image in an object-detecting processor;
 wherein the object-detecting processor:
  detects an object that has emerged within a monitoring region by using the input image corrected by the preprocessor and correction characteristic information, the correction characteristic information including an image characteristic derived from the correction in the preprocessor,
  updates the background image each time the input image is captured, the background image being compared with the input image in detecting the object, and
  outputs a location information of the detected object to the preprocessor; and
 wherein the preprocessor further:
  generates the corrected input image by enhancing the contrast of a whole or a part of the input image by using a converting equation based on a cumulative frequency for each luminance level of the input image, outputs the correction characteristic information to the object-detecting processor, and performs another correction to a subsequent input image within a region in which the object was detected, according to the location information.

2. A method performed by an object detection device which detects an object that has emerged within a monitoring region, on a basis of an input image from a camera photographing the monitoring region, the method comprising:

correcting by a preprocessor an input image by enhancing a contrast of the input image;

adjusting by the preprocessor an enhancing amount in the contrast of the input image in a manner that the enhancing amount increases with increasing a learning rate of a background image at an object detecting step;

detecting by an object-detecting processor the object that has emerged within the monitoring region by using the input image corrected in the preprocessing step and correction characteristic information, the correction characteristic information including an image characteristic derived from the correcting step; and updating by the object-detecting processor the background image each time the input image is captured, the background image being compared with the input image in detecting the object;

generating the correct input image by enhancing the contrast of a whole or a part of the input image in the correcting step by using a converting equation based on a cumulative frequency for each luminance level of the input image;

outputting the correction characteristic information to the object detecting step; and performing another correction to a subsequent input image within a region in which the object was detected according to the location information.

3. The object detection device of claim 1, wherein the correction characteristic information includes at least one of:

a width of zone in which the cumulative frequency does not exist in a histogram of the second corrected input image, a minimum luminance in the input image, a maximum luminance in the input image, and a maximum level difference between the input image and the second corrected input image, and wherein the object-detecting processor further determines a binary threshold based on the correction characteristic information, the binary threshold is obtained when binarizing a difference between the background image and the second corrected input image.

4. The object detection device of claim 3, wherein the preprocessor further:

generates the second corrected input image by calculating a weighted average of the first corrected input image and the input image, and outputs the second corrected input image to the object-detecting processor, a background updating rate being used in calculating the weighted average.

* * * * *